United States Patent [19]

Kurakake

[11] Patent Number: 4,511,982
[45] Date of Patent: Apr. 16, 1985

[54] NUMERICAL CONTROL DEVICE

[75] Inventor: Mitsuo Kurakake, Hino, Japan

[73] Assignee: Fujitsu Fanuc Limited, Minamitsuru, Japan

[21] Appl. No.: 355,724

[22] PCT Filed: Jul. 7, 1981

[86] PCT No.: PCT/JP81/00157
§ 371 Date: Mar. 5, 1982
§ 102(e) Date: Mar. 5, 1982

[87] PCT Pub. No.: WO82/00210
PCT Pub. Date: Jan. 21, 1982

[30] Foreign Application Priority Data

Jul. 7, 1980 [JP] Japan ................... 55-92383

[51] Int. Cl.³ .................. G06F 15/46; G06F 11/16
[52] U.S. Cl. .................... 364/167; 364/131; 364/187; 364/474; 371/9
[58] Field of Search ............. 364/184, 185, 186, 187, 364/170, 474, 475, 131, 132, 133, 134, 136, 167; 318/562-565; 371/8, 9

[56] References Cited

U.S. PATENT DOCUMENTS 3,636,331  1/1972  Amrehn ........................... 364/187
3,786,430  1/1974  Hajdu et al. ..................... 371/9 X
4,032,757  6/1977  Eccles ............................ 371/9 X
4,117,317  9/1978  Dooley, Jr. et al. .......... 364/184 X
4,281,379  7/1981  Austin ........................... 364/474 X
4,351,023  9/1982  Richer ............................ 364/187

Primary Examiner—Joseph F. Ruggiero
Attorney, Agent, or Firm—Staas & Halsey

[57] ABSTRACT

The present invention relates to a novel numerical control device which enables failures to be diagnosed even when a failure develops in a main processor for executing numerical control as well as failure diagnosis in hardware and the like. The invention includes a bus switching circuit provided in a main bus of an NC device. The NC device also includes a main processor for carrying out numerical control, a main memory, a tape reader, a numerical control panel and position control circuits. Further provided are a service processor for carrying out failure diagnosis and a service memory. When a failure develops in the main processor, the service processor immediately halts the execution of instructions by the main processor, the service processor is then connected to the main bus by the switching action of the bus switching circuit, and the service processor executes failure diagnosis by means of a diagnostic program for diagnosing failures, which program has been previously written into the service memory.

3 Claims, 1 Drawing Figure

NUMERICAL CONTROL DEVICE

DESCRIPTION

BACKGROUND OF THE INVENTION

This invention relates to a numerical control device which, in addition to a main processor which executes data processing for numerical control, is equipped with a separate service processor for system diagnosis.

A numerical control device (referred to as an NC device hereinafter) generally is provided with various diagnostic functions for precluding and detecting malfunctions due to hardware failures or the like, and is constructed so that diagnosis of, for example, an NC control panel abnormality or hardware failure, can be executed on-line and off-line. Conventionally, however, such diagnosis is performed by having the main processor, which carries out the data processing for numerical control, execute a diagnostic program which has been stored in the main memory. This has a disadvantage in that it becomes impossible to carry out the malfunction diagnosis when the main processor fails.

SUMMARY OF THE INVENTION

The present invention seeks to improve upon the disadvantages encountered in the prior art. The object of the present invention is to make diagnosis possible even in the event of, for example, a failure in the main processor, by providing a service processor for system diagnosis that is separate from the main processor which executes the data processing for numerical control, and by arranging it so that system diagnosis can be carried out independently of the main processor.

Specifically, in the present invention a main bus of an NC device is provided with a switching circuit, which NC device includes, connected to the switching circuit, a main processor for carrying out numerical control and for diagnosing failures in hardware and the like, and a main memory into which the diagnostic program for the main processor is written in addition to the program for numerical control. Also included are a tape reader, an NC control panel, a position control circuit and the like, and a service processor for diagnosing failures all connected to the switching circuit. The service processor for failure diagnosis has, with respect to the peripheral circuitry connected to the main bus of the main processor, a control capacity substantially equivalent to that of the main processor, and additionally possesses a function which stops the main processor from executing an instruction. Furthermore, the service processor is provided with a service memory into which the diagnostic program for the service processor is written. If for some reason an abnormality should develop in the main processor and make it impossible for the main processor to execute a failure diagnosis operation, the service processor is connected to the main bus by means of the bus switching circuit and the execution of instructions by the main processor is halted, whereupon the service processor diagnoses failures in the NC device through a method which is the same as that followed by the main processor.

DESCRIPTION OF THE PREFERRED EMBODIMENT

Figure 1:
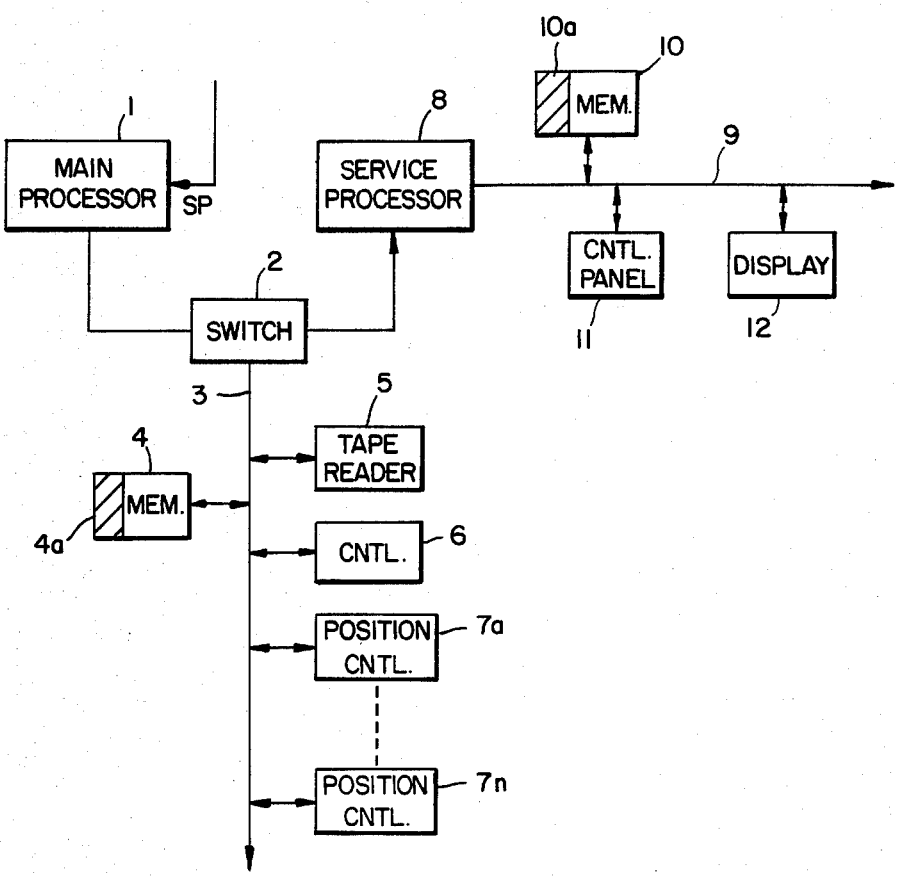
FIG. 1 is a block diagram showing the principal portions of a device embodying the present invention.

An embodiment of the present invention will now be described in conjunction with the accompanying drawing while making a comparison with a prior-art device in order to describe the present invention in greater detail.

FIG. 1 is a block diagram showing the principal portions of a device embodying the present invention, in which numeral 1 denotes a main processor, 2 a bus switching circuit, 3 a main bus, 4 a main memory, 4a a diagnostic program for the main processor written into the main memory 4, 5 a tape reader, 6 an NC control panel, 7a through 7n position control circuits, 8 a service processor, 9 a service processor bus, 10 a service memory, 10a a diagnostic program for the service processor written into the service memory 10, 11 a control panel, and 12 a display device such as a CRT.

In FIG. 1, the main processor 1 carries out data processing for numerical control. Specifically, input data from the tape reader 5 connected to the main bus 3, or data in the main memory 4, is processed in accordance with the data processing program stored in the main memory 4, and the results of such processing are applied to the position control circuits 7a through 7n to execute the prescribed numerical control. In addition, the diagnosis of such peripheral hardware as the NC control panel 6 connected to the main bus 3 is executed on-line and off-line in accordance with the diagnostic program stored in the main memory 4. Such an arrangement as well as the operation thereof is well known from the prior art.

The present embodiment, as opposed to the foregoing arrangement, is provided with the service processor 8 which is separate from the main processor 1. The arrangement is such that the service processor 8, by being connected to the main bus 3 through the bus switching circuit 2, is capable of exercising control substantially equivalent to that exercised by the main processor 1 with respect to the peripheral circuitry connected to the main bus 3. Here the bus switching circuit 2 is provided for the purpose of connecting the main bus 3 to the main processor 1 or to the service processor 8. Connected to the service processor bus 9 of the service processor 8 are the service memory 10 which stores the diagnostic program 10a executed by the service processor 8, the control panel 11 which is used during a diagnostic operation, as well as input/output units such as the display device 12, when necessary. The present embodiment is arranged so that a stop signal SP can be fed into the main processor 1 from the outside in order to halt the execution of its instructions. It can be arranged so that the stop signal SP enters from an error detection circuit (not shown) for detecting an error in one of the peripheral circuits, such as the generation of a parity error in the main memory, or enters from the service processor 8.

When an abnormality develops in the main processor 1 for some reason which makes it impossible for the main processor to carry out system diagnosis, the above arrangement enables the service processor 8 to execute diagnosis instead, so that the location of the abnormality can be discovered in a short period of time. System diagnosis is executed by the service processor 8 in the same manner as the conventional main processor 1 after the execution of instructions by the main processor has been halted by the stop signal SP.

Although the service processor 8 has a control capacity which is substantially equivalent to that of the main processor 1, it is provided for system diagnosis and not for actual numerical control, so that its functions and programs need not be as sophisticated as those of the main processor 1. Hence a processor of an inexpensive type will suffice. For example, use can be made of a microprocessor wherein a processor, ROM and RAM are constructed on a single chip. Furthermore, in a variable software-type NC device wherein the software configuration is different for each user, it is common to attach a device referred to as an engineering panel having a built-in processor to provide a facility for discovering software errors following shipment. If it is so arranged that the service processor is this built-in processor in the numerical control device of the above kind, then more effective use can be made of the engineering panel which conventionally merely serves as means for debugging and for software development.

In accordance with the foregoing embodiment, system diagnosis is carried out by the main processor 1, but the service processor 8 can be made to execute all of the diagnostic operation. In addition, an arrangement is possible wherein the service processor 8 may access the peripheral circuitry such as the NC control panel 6 through a bus different from the main bus 3.

As described hereinabove, the present invention includes a service processor which is separate from the main processor that executes data processing for numerical control, the arrangement being such that the service processor executes system diagnosis. Thus system diagnosis is possible even when the main processor fails, enabling the locations of abnormalities to be discovered in a short period of time. Particularly, in accordance with the present invention, if the processor which is part of the engineering panel, which is attached to and shipped together with a variable software-type NC device, is utilized as the service processor, then the diagnostic function of the numerical control device can be enhanced with the addition of only a small quantity of hardware.

What is claimed is:

1. A numerical control device having peripheral circuitry including a main memory, a tape reader, a numerical control panel and position control circuits connected to a main bus, said device comprising:

main processor means, operatively connected to the main bus, for carrying out processing for numerical control;

switching circuit means, operatively connected to said main processor means and the main bus, for connecting said main processor means to the main bus;

service processor means, operatively connected to said main processor means and the main bus via said switching circuit means and which is separate from said main processor means, for halting the execution of instructions by said main processor means and for diagnosing failure of said main processor means and the peripheral circuitry, said service processor means having a numerical control processing capacity substantially equivalent to that of said main processor means with respect to the peripheral circuitry connected to the main bus which is connected to said main processor through said switching circuit means, said switching circuit means for connecting said service processor means to the main bus when said main processor means fails;

a service processor bus operatively connected to said service processor means; and a service memory, a control panel and a display device operatively connected to said service processor bus.

2. A numerical control device according to claim 1, wherein said service processor means is a processor within an engineering debugging panel for the numerical control device.

3. A numerical control system, comprising:

a main processor for numerical control processing;

a switching circuit operatively connected to said main processor;

peripheral circuits operatively connected to said switching circuit and including numerical control circuits and a diagnostic program memory including a first system diagnostic program executable by said main processor;

a service processor memory including a second system diagnostic program; and a service processor, operatively connected to said switching circuit and said service processor memory, for diagnosing failure of said main processor and said peripheral circuits when said main processor fails in accordance with the second diagnostic program, said switching circuit connecting said service processor to said peripheral circuits when said main processor fails.

* * * * *